United States Patent Office 3,329,607
Patented July 4, 1967

3,329,607
METHOD FOR THE BIOLOGICAL PURIFICATION OF DRINKING WATER
Louis Colobert, Collonges-au-Mont-d'Or, and Andre Cier and Claude Nofre, Lyon, France, assignors to "EGEMA," a society of France
No Drawing. Filed Jan. 11, 1963, Ser. No. 250,790
Claims priority, application France, Jan. 12, 1962, 884,715, Patent 1,320,776; Apr. 17, 1962, 894,712, Patent 2041M
5 Claims. (Cl. 210—61)

This invention relates to a process for preparing compositions having bactericidal, virucidal, anti-parasitic and cytotoxic properties and also to the compositions obtained by means of this process.

It has been found that when an enediol (such as ascorbic acid) is associated with ions of metal of the transition series in the presence of molecular oxygen, the composition behaves, in the aqueous phase, as an oxidation-reduction system in which the metal is alternately reduced and oxidised, this cycle continuing to be repeated so long as a sufficient concentration of the enediol is present.

By reason of the occurrence of chain reactions, each cycle results in the transitory formation of free radicals, in particular free hydroxyl radicals, that is to say chemical entities to which may be attributed the biological action of indirectly acting in the same manner as ionizing radiations.

Such a mechanism thus leads to the conception that the composition has properties which are of the same character as ionising radiations.

In actual fact, the effects expected have been demonstrated both in vitro on various substrates and in vivo with micro-organisms and with mammals.

The enediols which may be employed in carrying the process according to the invention into effect include ascorbic acid, dihydroxymaleic acid and the reductones, ascorbic acid being preferred, however, by reason of its total lack of toxicity and its low cost; it may be used in the free form or in the form of a water-soluble salt.

The elements of the transition series which may be employed according to the invention include copper, iron, tin, cobalt and manganese, any of which may be employed in the form of salts, in particular water-soluble salts. Copper and iron are preferred. However, the chelation of the iron by certain agents considerably increases the reactivity of the composition although chelation by the same agents may possibly have an inhibiting effect in the case of the other metals of the transition series. The use of chelated iron affords practical advantages, principally for therapeutical applications, by avoiding parasitic reactions and enabling preparations with a neutral pH to be obtained.

Thus, compositions in which the iron is chelated by ethylene diamine tetra-acetic acid, cyclohexane diamine tetra-acetic acid or polyphosphates are made more potent but in contrast, the catalytic activity of copper is inhibited by ethylene diamine tetra-acetic acid as well as by cystine, histidine and penicillamine.

Whether it is a question of inhibiting the composition or, on the contrary, of rendering the compositions more potent, the optimum ratio between the metallic ion and the chelating agent must be close to the equimolecular ratio.

The ratio between the enediol, such as ascorbic acid, and the metallic ion may vary within very wide limits, for example from 40:1 to 1:40, experience having proved that the effect of a reduction in the concentration of one of the constituents is at least partially compensated by an increase in the concentration of the other.

The composition obtained when the process according to the invention is carried into effect has bactericidal, virucidal and anti-parasitic properties and consequently may find many applications, an important example of which is in the biological purification of drinking water.

In this example, the enediol chosen is ascorbic acid or one of its salts and the metallic ion is copper in the form of a water-soluble salt. Theoretically, it is of little importance whether the copper is introduced in the form of the cuprous or cupric ion. However, the cupric derivatives are preferred on account of their greater stability and higher solubility, the preferred derivative being pentahydrated crystallised cupric sulphate, $CuSO_4.5H_2O$. The simultaneous presence in suitably areated water of the ascorbic acid and the copper ions, whatever may be the proportions employed, ensures a microbicidal, virucidal and anti-parasitic effect, as tests have shown. However, in order to obtain an effect of practical value, the concentration of the copper ions in the water should not go below $10^{-7}$ M and that of the ascorbic acid should not go below $10^{-5}$ M.

It is desirable that the ascorbic acid be the predominant constituent, for the following reasons. In the first place, the atoxic ascorbic acid advantageously replaces the copper which should preferably be held at a concentration lower than that usually accepted for a potable water. In the second place, an increase in the concentration of the ascorbic acid increases the duration of the period for which the purifying composition is effective, for example, to several hours. If the water is to be consumed before the composition has lost its activity, the latter can be stopped by adding to the water before its consumption a copper-chelating agent, such as histidine, cystine, penicillamine, ethylene diamine tetra-acetic acid (also termed EDTA), a sodium salt of the latter or a metallic chelate having a dissociation constant higher than that of the copper chelate. This chelating agent, used in molecular proportions substantially equal to the copper present arrests the oxidation-reduction processes which cause activation of the molecular oxygen.

Taking these experimental facts into consideration, it has been found that a particularly satisfactory purifying composition is obtained by reacting ascorbic acid and a cupric salt, such as cupric sulphate, in a molar ratio of about 30:1.

In the case of water polluted to an average extent, this composition is preferably used at the rate of 0.2 millimol of ascorbic acid per litre, it being possible to double this dosage for very heavily polluted water. 10 minutes after it has been dissolved in the water, complete biological purification thereof is achieved. In order to destroy the activity of the composition, a chelating agent can then be dissolved in the water in a quantity at least equal molecularly to that of the dissolved copper.

The composition referred to above may be prepared in the form of a dose ready for use suitable for purifying one litre of water, this dose being in the form of a solution or of a powder or tablets containing, if required, an inert vehicle, or in the form of a combination of these latter.

This composition is formulated as follows, the molar concentration of the constituents in the water to be purified being likewise indicated.

| Constituents | Weight | Molar Concentration |
|---|---|---|
| Cupric sulphate ($CuSO_4.5H_2O$) | 1.66 mg | $0.066 \times 10^{-4}$ M. |
| Ascorbic acid | 35.2 mg | $2 \times 10^{-4}$ M. |

The chelating agent may be marketed with this composition in the form of a separate dose intended to be added to one litre of water which has been treated with the composition in order to arrest the activity of this composition. The dose of chelating agent may advantageously be either 3.5 mg. of the disoduim salt of EDTA crystallised with two molecules of water or 3.2 mg. of cystine or 2 mg. of histidine, made available in solution or in powdered, granular or tablet form.

The following examples describe experiments demonstrating the results stated.

Example 1

The reaction of 2.49 mg. of $CuSO_4.5H_2O$ and 55.2 mg. of ascorbic acid causes complete sterilisation of one litre of spring water (pH 8), into which either $10^5$ *Escherichia coli* or $10^6$ $DI_{50}$ of the poliomyelitis virus have been previously introduced, in less than 10 minutes.

A dose of copper sulphate 10 times smaller, or even 100 times smaller, in the presence of the previously indicated dose of ascorbic acid has a high degree of virucidal and microbicidal activity but does not cause complete sterilisation in 10 minutes under the experimental conditions specified.

Example 2

If the dose of copper sulphate used is fixed at 3.32 mg. per litre, it is found that the minimum dose of ascorbic acid required to cause complete sterilisation in 10 minutes with respect to *Escherichia coli* and the poliomyelitis virus ranges between 17 and 9 mg. per litre.

Example 3

Within certain limits, it is possible to achieve the effect sought (sterilisation in 10 minutes under the experimental conditions specified) either by reducing the dose of ascorbic acid while increasing the dose of copper sulphate or, on the contrary, by reducing the dose of copper sulphate while increasing the dose of ascorbic acid.

Thus, the use of a mixture of 1 mg. of copper sulphate and 35.2 mg. of ascorbic acid destroys within 10 minutes 94% of the bacteria introduced but the use of a mixture of 1 mg. of copper sulphate and 40 mg. of ascorbic acid causes complete sterilisation in 10 minutes.

Conversely, the use of a mixture of 2.49 mg. of copper sulphate and 9 mg. of ascorbic acid does not totally destroy *Escherichia coli* in 10 minutes whereas complete sterilisation is achieved in that time if the dose of ascorbic acid is maintained at 9 mg. but the dose of copper sulphate is increased to 3 mg.

Example 4

Increasing the dose of ascorbic acid has the effect of prolonging the duration of the microbicidal and virucidal activity of the ascorbic acid-copper system.

Thus, if there is introduced into separate quantities each of one litre of spring water not containing any bacteria or viruses a fixed dose 3.32 mg. of copper sulphate and into respective quantites in separate test, progressively increased doses of ascorbic acid and the actual microbicidal activity in each of these quantities of water is estimated after the lapse of progressively longer periods of time from the moment when the reagents are added, by introducing *Escherichia coli* and determining the number of bacteria capable of reproducing themselves after being present for 10 minutes in the treated water, it is found that for a dose of 9 mg. of ascorbic acid a destruction of about 50% of the bacteria can still be obtained 2 hours after the reagents have been introduced. For a dose of 18 mg. of ascorbic acid, this effect is observed about 3 hours after the reagents have been introduced. For a dose of 35.2 mg. of ascorbic acid, the effect is observed about 5 hours after the introduction of the reagents.

Example 5

The presence of organic matter in the water, playing the part of a competitor in relation to the free radicals, reduces the bactericidal and virucidal efficacy of the ascorbic acid-copper system, but the use of 1.25 mg. of copper sulphate and 17.6 mg. of ascorbic acid per litre still causes complete sterilisation in 10 minutes of 100,000 *Escherichia coli* and of $10^6$ $DI_{50}$ poliomyelitis virus in spring water containing 10 mg. of serum albumen per litre.

Example 6

A dose of 1.66 mg. of copper sulphate and 35.2 mg. of ascorbic acid per litre appears to be an average dose with a margin of effectiveness suitable for ensuring the biological purification of an aerated water having the chemical and organoleptic characteristics of a drinking water. This dose ensures the total destruction in 10 minutes of at least $10^6$ of the following bacteria:

*Escherichia coli*
*Bacillus subtilis* (vegetative forms)
*Streptococcus faecalis*
*Salmonella typhi*
*Salmonella paratyphi* A
*Salmonella paratyphi* B
*Sarcina flava*
*Vibrio cholerae*
*Shigella dysenteriae*
*Shigella flexneri*
*Proteus vulgaris*
*Staphylococcus aureus* of $10^2$ of the following parasites and viruses:

*Amoeba dysenteriae*
vaccinia virus of $10^7$ $DI_{50}$ of the following viruses;

Poliomyelitis virus
Influenza A and B virus
Herpes virus

The system therefore proves to be active on all the vegetative forms of the micro-organisms studied so far. It is to be noted, however, that the above-indicated doses have proved to be inadequate for rendering the spores of *Bacillus subtilis* incapable of germinating.

Example 7

The addition, per litre, of 1.6 mg. of cystine, 1 mg. of histidine, 2.79 mg. of the disodium slat of ethylene diamine tetra-acetic acid (disodium $EDTA.2H_2O$), 2.04 mg. of ethylene diamine tetra-acetic acid, 2.49 mg. of the calcium chelate of ethylene diaminotetra-acetic acid or 2.8 mg. of the sodium salt of the latter, that is to say a concentration of the repsective additive equimolecular with that of the copper, instantaneously and definitely inhibits the virucidal and microbicidal activity of the ascorbic acid-copper system by interrupting the oxidation-reduction cycle.

It follows from these examples that the following method of operation is suitable for ensuring the biological purification of a water having the chemical and organoleptical characteristics of a drinking water.

To each litre of aerated water, 1.66 mg. of crystallised cupric sulphate ($CuSO_4.5H_2O$) and 35.2 mg. of ascorbic acid are added simultaneously or in succession.

After making sure that dissolution is complete 10 minutes is allowed to elapse, this being the minimum period of time within which biological purification of the water can be considered as having been satisfactorily accomplished. Then either 3.5 mg. of the disodium salt of ethylene damine tetra-acetic acid (disodium $$EDTA.2H_2O)$$

are added per litre, that is to say a quantity slightly greater than the equimolecular quantity with respect to the copper, or 3.2 mg. of cystine per litre or 2.0 mg. of histidine per litre are added, that is to say a dose twice that required for chelating the copper supplied by the treating preparation; the water is consumable immediately the dissolution of these agents is complete.

There is no disadvantage in waiting more than ten minutes before adding the chelating agent, since the purifying activity is manifested for several hours. Care should be taken to prolong this action as long as possible whenever it is suspected that the biological quality of the water is very bad.

There is no drawback in doubling the dose of ascorbic acid and copper if the bacteriological quality of the water is very bad or if the water appears to be rich in organic matter. In these cases it is likewise advisable to double the dose of chelating agent which is added before the water is consumed.

The use of such doses of copper (0.42 mg. of copper ions per litre) cannot cause toxic troubles even in the case of excessive consumption of the treated water and prolonged use. It may even be considered as beneficial, a sufficient intake of copper being essential for a good physiological balance.

The use of the aforesaid chelating agents in the proportions indicated does not entail any drawback, even in the case of excessive or prolonged consumption of the treated water.

The presistence in the treated water of the products resulting from the auto-oxidation of the ascorbic acid or the persistence of the ascorbic acid itself is not a disadvantage even in the case of excessive or prolonged consumption of this water and may even be regarded as beneficial in the case of the persistence of a certain amount of unconverted ascorbic acid.

As has been indicated above, it is possible to pack preparations for convenient use not only for purifying given volumes of water but also preparations intended for external antiseptic treatments, mouthwashes, gargles, eye-washes, vaginal douches, etc. and cleaning wounds.

In the case of the copper-ascorbic acid composition, the relative concentrations per litre of 2.32 mg. of pentahydrated copper sulphate and 70.4 mg. of ascorbic acid have proved to be effective as a gargle in the treatment of streptoangina.

In the case of the employment for external use of the system iron chelate of sodium ethylene diamine tetraacetate ascorbic acid, the following concentrations have proved to be particularly advantageous: for one litre: Fe(II)Na$_2$EDTA, 390 mg. and sodium ascorbate, 792.44 mg.

It will be understood that the invention is not limited to the methods of use described which have been given only by way of examples.

It has been stated above that the composition resulting from the reaction, in the presence of molecular oxygen, of an enediol and ions of a metal of the transition series possesses radiomimetic properties, that is to say properties similar, in their effects on the cells, to those of ionising radiations, which properties are manifested by a cytotoxic action and can be applied with advantage, by internal methods, in the treatment of cellular proliferations whether tumoral or not or in the active destruction of exceptionally sensitive tissues, notably bone narrow.

The radiomimetic cytotoxic action of a preparation obtained according to the invention by reacting ascorbic acid and ferrous ions in equimolecular proportions and in the presence of ethylene damine tetra-acetic acid or its salts, is shown by the test results set forth hereunder:

The respective concentrations of 1 millimol per litre for the iron chelate of sodium ethylene diamine tetraacetate and of 1 millimol per litre for sodium ascorbate have proved to be particularly advantageous, that is 390 mg. per litre for Fe(II)Na$_2$EDTA and 198.11 mg. per litre for monosodium ascorbate.

The LD$_{50}$ in the case of mice at 30 days for this composition is 0.59 millimol of each of the constituents per kg. of weight, although the pharmacological activity of the composition is already manifested at doses fifty to one hundred times smaller. It is thus that it has been possible to demonstrate the radiomimetic and radio-sensitising properties in vivo with mice and in particular as regards lethality and hematologic and cellular injuries.

The radiomimetic effects of the composition are manifested at sub-lethal doses, of the order of 0.1 millimol of each of the constituents per kilogram of mouse, by a cellular injury which affects selectively the radio-sensitive cells and which has been demonstrated in particular by:

(a) A leukopenic activity which is at the maximum between the fifth and seventh days after parenteral injection of the composition and may amount to 50%, as concerns the whole of the figured elements of the white series;

(b) An inhibition of the synthesis of antibodies;

(c) A decrease in the coagulability of the blood.

The radio-sensitising effects have been demonstrated with mice, on a strain of known radio-sensitivity, as evidenced by the following results obtained after an irradiation of 550 rads (gamma rays, cobalt 60):

Irradiated control mice, mortality percentage: 20
Mice treated and irradiated, morality percentage: 70.

The various compositions obtained by the process according to the invention, whether for therapeutical use or not, may be formulated in particular either in the form of a powder, with or without the addition of an inert carrier, or in the form of an aqueous solution prepared in advance or to be prepared at the time of use. Thus, in particular, the composition ascorbic acid-pentahydrated copper sulphate is advantageously formulated in the form of a powder from which solutions for use in irrigations, paintings and instillations can be prepared for immediate use in the case of external application.

The composition ascorbic acid-ferrous ethylene diamine tetra-acetate is preferably supplied in dry ampoules sealed in the absence of oxygen or in the form of an aqueous solution for use, in particular, internally.

We claim:

1. A method for the biological purification of drinking water, which comprises the successive phases of adding to the water, in the presence therein of molecular oxygen, an enediol selected from the group consisting of ascorbic acid, dihydroxymaleic acid, and the reductones in association with a metal selected from the group consisting of copper, iron, tin, cobalt and manganese which ionizes in aqueous solution and forms with the enediol an oxidation-reduction system which causes the formation of free hydroxyl radicals having a destructive action on pathogenic germs, the molar ratio of enediol to metallic ions being from 40:1 to 1:40, and then adding, a chelating agent for said metal.

2. A method according to claim 1 wherein the enediol is added to the water in association with a water-soluble salt of copper capable of liberating copper ions in solution in an equivalent proportion to copper sulfate.

3. A method for biological purification of drinking water, which comprises the successive phases of adding to the water, in the presence therein of molecular oxygen, ascorbic acid in the free acid form in association with copper sulfate which ionizes in the aqueous solution and forms with the enediol an oxidation-reduction system which causes the formation of free hydroxyl radicals having a destructive action on pathogenic germs, the molar ratio of ascorbic acid to copper sulfate being about 30:1, and then adding, after a period of time sufficient for effecting purification has elapsed, a salt of ethylene diamine tetra-acetic acid as a chelating agent for the copper.

4. A method for the biological purification of drinking water, which comprises the successive phases of adding to the water, in the presence therein of molecular oxygen, ascorbic acid in the form of a water-soluble salt in association with copper sulfate pentahydrate which ionizes in aqueous solution and forms with the enediol an oxidation-reduction system which causes the formation of free hydroxyl radicals having a destructive action on pathogenic germs, the molar ratio of ascorbic acid to copper ions being about 30:1, and then adding, after a period of time sufficient for effecting purification has elapsed, the sodium salt of EDTA as a chelating agent for the copper.

5. A method for the biological purification of drinking water, which comprises the successive phases of adding to the water, in the presence therein of molecular oxygen, ascorbic acid in the form of water-soluble salt in association with copper sulfate pentahydrate which ionizes in aqueous solution and forms with the ascorbic acid an oxidation-reduction system which causes the formation of free hydroxyl radicals having a destructive action of pathogenic germs, the molar ratio of ascorbic acid to copper sulfate being about 30:1, and then adding, after a period of time sufficient for effecting purification has elapsed, histidine as a chelating agent for the copper.

References Cited

UNITED STATES PATENTS

| | | | |
|---|---|---|---|
| 2,427,692 | 9/1947 | Ruskin | 260—343.7 X |
| 2,734,028 | 2/1956 | Domogalla | 210—64 X |
| 3,080,315 | 3/1963 | Silvey | 210—62 X |

OTHER REFERENCES

"Ascorbic Acid," Webster's New International Dictionary, 2nd Edition Unabridged, page 160.

MORRIS O. WOLK, *Primary Examiner.*

MICHAEL E. ROGERS, *Assistant Examiner.*